US012769035B2

(12) United States Patent
Rao et al.

(10) Patent No.: US 12,769,035 B2
(45) Date of Patent: Oct. 20, 2026

(54) FRESNEL LENS WITH ORGANIC SOLID CRYSTALS

(71) Applicant: Meta Platforms Technologies, LLC, Menlo Park, CA (US)

(72) Inventors: Tingling Rao, Bellevue, WA (US); Xingzhou Tu, Redmond, WA (US); Yang Zhao, Woodinville, WA (US); Andrew John Ouderkirk, Kirkland, WA (US); Ying Geng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 639 days.

(21) Appl. No.: 18/192,986

(22) Filed: Mar. 30, 2023

(65) Prior Publication Data

US 2023/0393309 A1 Dec. 7, 2023

Related U.S. Application Data

(60) Provisional application No. 63/348,579, filed on Jun. 3, 2022.

(51) Int. Cl.
*G02B 3/08* (2006.01)
*G02B 1/02* (2006.01)
(Continued)

(52) U.S. Cl.
CPC ................. *G02B 3/08* (2013.01); *G02B 1/02* (2013.01); *G02B 1/041* (2013.01); *G02B 2003/0093* (2013.01); *G02B 27/0172* (2013.01)

(58) Field of Classification Search
CPC . G02B 3/08; G02B 1/02; G02B 1/041; G02B 27/0172; G02B 2003/0093;
(Continued)

(56) References Cited

U.S. PATENT DOCUMENTS 9,810,904 B1 * 11/2017 Bierhuizen ........ G02B 27/0172
10,845,597 B1 * 11/2020 Gollier ................. G02B 5/3025
(Continued)

FOREIGN PATENT DOCUMENTS

WO WO-2023007329 A1 * 2/2023 ............... G02B 3/02
WO 2023114268 A1 6/2023

OTHER PUBLICATIONS

European Search Report for European Patent Application No. 23177380.5, dated Nov. 7, 2023, 9 pages.

*Primary Examiner* — Collin X Beatty
(74) *Attorney, Agent, or Firm* — Greenberg Traurig, LLP

(57) ABSTRACT

A Fresnel lens includes a lens body having a structured surface with a plurality of facets, where the lens body includes an organic solid crystal having mutually-orthogonal refractive indices, $n_x$, $n_y$, $n_z$. In a related vein, an apparatus includes a display and an optical configuration configured to receive display light from the display, where (a) the optical configuration includes a Fresnel lens assembly having a Fresnel lens and a Pancharatnam-Berry Phase lens overlying the Fresnel lens, (b) the Fresnel lens includes a lens body having a structured surface including a plurality of facets, and (c) the lens body includes an organic solid crystal.

20 Claims, 8 Drawing Sheets

(51) Int. Cl.

| | |
|---|---|
| ***G02B 1/04*** | (2006.01) |
| ***G02B 3/00*** | (2006.01) |
| ***G02B 27/01*** | (2006.01) |

(58) Field of Classification Search

CPC .. G02B 5/3025; G02B 5/3083; G02B 27/283; G02B 2027/0178

See application file for complete search history.

(56) References Cited

U.S. PATENT DOCUMENTS

2007/0153402 A1* 7/2007 Destain ................ G03B 21/208 359/742
2021/0208389 A1* 7/2021 Lu ...................... G02B 27/0093
2022/0035075 A1 2/2022 Rao et al.
2022/0082749 A1 3/2022 Malhotra et al.

* cited by examiner

FRESNEL LENS WITH ORGANIC SOLID CRYSTALS

CROSS-REFERENCE TO RELATED APPLICATION

This application claims the benefit of priority under 35 U.S.C. § 119(e) of U.S. Provisional Application No. 63/348,579, filed Jun. 3, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
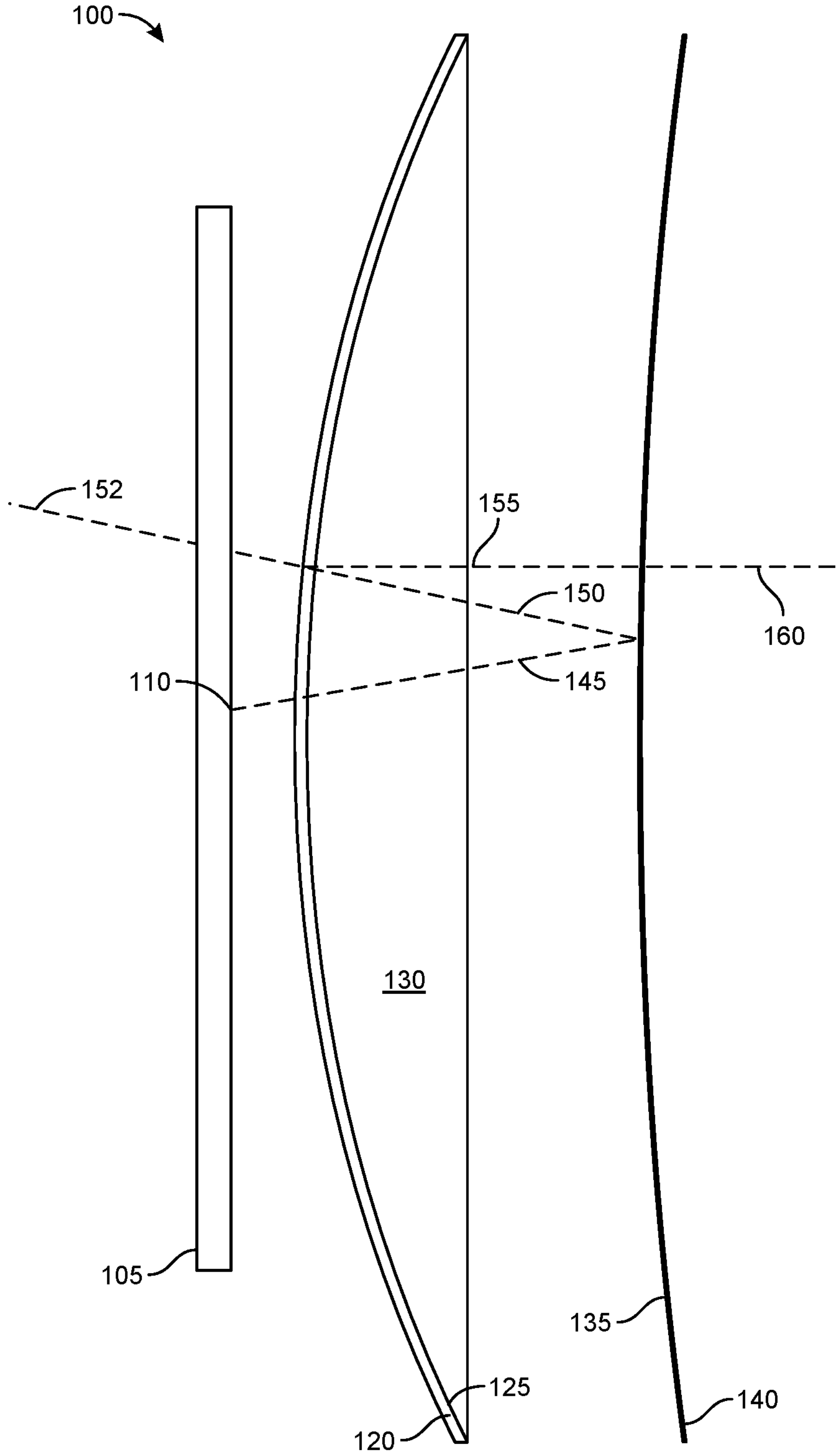
FIG. 1 shows an example optical configuration of a device in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Polymer and other organic materials may be incorporated into a variety of different optic and electro-optic systems and devices, including passive and active optics and electroactive devices. Lightweight and conformable, one or more polymer/organic solid layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. Governments may use such devices for military training, medical professionals may use such devices to simulate surgery, and engineers may use such devices as design visualization aids.

Polymer materials exhibiting optical anisotropy may be incorporated into a variety of systems and devices, including lenses, birefringent gratings, reflective polarizers, optical compensators and optical retarders for systems using polarized light such as liquid crystal displays (LCDs). Fresnel lenses may be used in wearable optics to focus light. Birefringent gratings may be used as optical combiners in augmented reality displays, for instance, and as input and output couplers for waveguides and fiber optic systems. Reflective polarizers may be used in many display-related applications, particularly in pancake optical systems and for brightness enhancement within display systems that use polarized light. For orthogonally polarized light, pancake lenses may use reflective polarizers with extremely high contrast ratios for transmitted light, reflected light, or both transmitted and reflected light.

A reflective polarizer may be configured to reflect a first polarization of light and transmit a second polarization of light. For example, a reflective polarizer may reflect one handedness of circular polarized light and transmit the other handedness of circularly polarized light. Example apparatus may include a beamsplitter lens or, in some examples, a second Fresnel lens assembly. A beamsplitter lens may include a beamsplitter formed as a coating on a lens.

In connection with exemplary devices and applications, a system or device may include an optical element such as a lens for guiding light. Notwithstanding recent developments, it would be advantageous to provide lightweight and versatile optical elements that provide improved color uniformity in associated systems/devices. In accordance with particular embodiments, a Fresnel lens may include or be formed from a polymer material. As will be appreciated, a Fresnel lens may be configured for a variety of applications due to its thin, lightweight construction, and good light gathering capability. A polymer-based Fresnel lens may be used in magnifiers, image formation, or in projection lenses for illumination systems.

For many polymer-based Fresnel lenses, the resolution of an associated VR display may be limited due to diffraction of light caused by the large curvature and small pitch of typical Fresnel structures. In some cases, diffraction may be lessened and resolution improved by forming small curvature and large pitch Fresnel lenses from high index materials. However, many high index materials are associated with undesirable haze/absorption (e.g., polymer composites) or high density and high cost (e.g., inorganic crystals).

A Fresnel lens may include a surface having a plurality of oblique facets that are separated by steps, where the facets include an organic or organo-metallic material (e.g., organic solid crystal). The organic or organo-metallic material may be polycrystalline and may include a single crystalline phase. The surface of such a lens may have a bi-conic architecture that has a radius of curvature within the x-z plane that is different than the radius of curvature within the y-z plane.

In some embodiments, the organic or organo-metallic material may have three principal indices of refraction, where at least two indices are different from each other (e.g., $n_x=n_y\neq n_z$, $n_x=n_z\neq n_y$, $n_y=n_z\neq n_x$, or $n_x\neq n_y\neq n_z$). A Fresnel lens may be configured such that (a) the largest refractive index lies in the plane of the lens, i.e., parallel to the x-axis (horizontal) or parallel to the y-axis (vertical), (b) the second largest refractive index is out-of-plane, i.e., parallel to the z-axis, and (c) the largest refractive index is at least approximately 1.6, e.g., greater than 1.6, 1.7, 1.8, or even 1.9.

Disclosed also are optical devices that includes a display and an optical configuration configured to receive display light from the display and direct the display light to a remote viewing location. The optical configuration may include a PBP lens and a Fresnel lens as disclosed herein. The Fresnel lens may include a lens body having a structured surface including a plurality of facets where the lens body is formed from an optically anisotropic organic solid crystal having mutually-orthogonal refractive indices, $n_x$, $n_y$, $n_z$.

In conjunction with various methods of manufacture, solvent-, melt-, or vapor-based crystal growth processes may be used to produce sized organic solid crystals suitable for forming a Fresnel lens. Example materials may be diced and polished along designated orientations. Fresnel lenses may be fabricated through the deposition and etching of an oriented organic solid crystal substrate.

One or more source materials may be used to form an organic solid crystal substrate. Example organic materials may include various classes of crystallizable organic semiconductors. In accordance with various embodiments, organic semiconductors may include small molecules, macromolecules, liquid crystals, organometallic compounds, oligomers, and polymers. Organic semiconductors may include p-type, n-type, or ambipolar polycyclic aromatic hydrocarbons, such as anthracene, phenanthrene, carbon 60, pyrene, corannulene, fluorene, biphenyl, ter-phenyl, etc. Example compounds may include cyclic, linear and/or branched structures, which may be saturated or unsaturated, and may additionally include heteroatoms and/or saturated or unsaturated heterocycles, such as furan, pyrrole, thiophene, pyridine, pyrimidine, piperidine, and the like. Heteroatoms may include fluorine, chlorine, nitrogen, oxygen, sulfur, phosphorus, as well as various metals. Suitable feedstock for molding solid organic semiconductor materials may include neat organic compositions, melts, solutions, or suspensions containing one or more of the organic materials disclosed herein.

Structurally, the disclosed organic materials, as well as the substrates and lenses derived therefrom, may be single crystal, polycrystalline, or glassy. Organic solid crystals may include closely packed structures (e.g., organic molecules) that exhibit desirable optical properties such as a high and tunable refractive index, and high birefringence. Anisotropic organic solid materials may include a preferred packing of molecules or a preferred orientation or alignment of molecules.

Such organic solid crystal (OSC) materials may provide functionalities, including phase modulation, beam steering, wave-front shaping and correction, optical communication, optical computation, holography, and the like. Due to their optical and mechanical properties, organic solid crystals may enable high-performance devices, and may be incorporated into passive or active optics, including AR/VR headsets, and may replace comparative material systems in whole or in part, such as polymers, inorganic materials, and liquid crystals. In certain aspects, organic solid crystals may have optical properties that rival those of inorganic crystals while exhibiting the processability and electrical response of liquid crystals.

Due to their relatively low melting temperature, organic solid crystal materials may be molded to form a desired structure. Molding processes may enable complex architectures and may be more economical than the cutting, grinding, and polishing of bulk crystals. In one example, a single crystal or polycrystalline shape such as a sheet or cube may be partially or fully melted into a desired form and then controllably cooled to form a single crystal having a new shape such as a lenticular or lens shape.

A process of molding an optically anisotropic crystalline or partially crystalline substrate, for example, may include operational control of the thermodynamics and kinetics of nucleation and crystal growth. In certain embodiments, a temperature during molding proximate to a nucleation region of a mold may be less than a melting onset temperature ($T_m$) of a molding composition, while the temperature remote from the nucleation region may be greater than the melting onset temperature. Such a temperature gradient paradigm may be obtained through a spatially applied thermal gradient, optionally in conjunction with a selective melting process (e.g., laser, soldering iron, etc.) to remove excess nuclei, leaving few nuclei (e.g., a single nucleus) for crystal growth.

To promote nucleation and crystal growth, a selected temperature and temperature gradient may be applied to a crystallization front of a nascent substrate. For instance, the temperature and temperature gradient proximate to the crystallization front may be determined based on the selected feedstock (i.e., molding composition), including its melting temperature, thermal stability, and rheological attributes.

A suitable mold for molding an organic solid crystal substrate may be formed from a material having a softening temperature or a glass transition temperature ($T_g$) greater than the melting onset temperature ($T_m$) of the molding composition. The mold may include any suitable material, e.g., silicon, silicon dioxide, fused silica, quartz, glass, nickel, silicone, siloxanes, perfluoropolyethers, polytetrafluoroethylenes, perfluoroalkoxy alkanes, polyimide, polyethylene naphthalate, polyvinylidene fluoride, polyphenylene sulfide, and the like.

An epitaxial or non-epitaxial growth process may be used to form an organic solid crystal (OSC) layer over a suitable mold. A seed crystal for encouraging crystal nucleation and an anti-nucleation layer configured to locally inhibit nucleation may collectively promote the formation of a limited number of crystal nuclei within one or more specified location(s), which may in turn encourage the formation of larger organic solid crystals. In some embodiments, a nucleation-promoting layer or seed crystal may be configured as a thin film.

Example nucleation-promoting or seed materials may include one or more metallic or inorganic elements or compounds, such as Pt, Ag, Au, Al, Pb, indium tin oxide, $SiO_2$, and the like. Further example nucleation-promoting or seed crystal materials may include organic compounds, such as a polyimide, polyamide, polyurethane, polyurea, polythiourethane, polyethylene, polysulfonate, polyolefin, as well as mixtures and combinations thereof. In some examples, a nucleation-promoting material may be configured as a textured or aligned layer, such as a rubbed polyimide or photoalignment layer, which may be configured to induce directionality or a preferred orientation to an over-formed organic solid crystal layer.

An example method for manufacturing an organic solid crystal substrate includes providing a mold, forming a layer of a nucleation-promoting material over at least a portion of a surface of the mold, and depositing a layer of molten feedstock over the surface of the mold and in contact with the layer of the nucleation-promoting material, while maintaining a temperature gradient across the layer of the molten feedstock.

An anti-nucleation layer may include a dielectric material. In further embodiments, an anti-nucleation layer may include an amorphous material. In example processes, homogeneous or heterogeneous crystal nucleation may occur independent of the mold.

In some embodiments, a surface treatment or release layer disposed over the mold may be used to control nucleation and growth of the organic solid crystal (OSC) and later promote separation and harvesting of a bulk crystal. For instance, a coating having a solubility parameter mismatch with the deposition chemistry may be applied to the mold (e.g., globally or locally) to suppress interaction between the mold and the crystallizing layer during the deposition process.

Example surface treatment coatings may include oleophobic coatings or hydrophobic coatings. A thin layer, e.g., monolayer or bilayer, of an oleophobic material or a hydrophobic material may be used to condition the mold prior to an epitaxial process. The coating material may be selected based on the mold and/or the organic crystalline material. Further example surface treatment coating materials include siloxanes, fluorosiloxanes, phenyl siloxanes, fluorinated coatings, polyvinyl alcohol, and other OH bearing coatings, acrylics, polyurethanes, polyesters, polyimides, and the like.

In some embodiments, a release agent may be applied to an internal surface of the mold and/or combined with the molding composition. A surface treatment of an inner surface of the mold may include the chemical bonding or physical adsorption of small molecules, or polymers/oligomers having linear, branched, dendritic, or ringed structures, that may be functionalized or terminated, for example, with fluorinated groups, silicones, or hydrocarbon groups.

A buffer layer may be formed over the deposition surface of a mold. A buffer layer may include a small molecule that may be similar to or even equivalent to the small molecule forming the organic solid crystal, e.g., an anthracene single crystal. A buffer layer may be used to tune one or more properties of the deposition/growth surface of the mold, including surface energy, wettability, crystalline or molecular orientation, etc.

A further example method for manufacturing an organic solid crystal substrate includes forming a layer of a molecular feedstock over a surface of a mold, the molecular feedstock including crystallizable organic molecules, forming a selected number of crystal nuclei from the organic molecules within a nucleation region of the molecular feedstock layer, and growing the selected number of crystal nuclei to form an organic solid crystal substrate (i.e., lens body). In some embodiments, the selected number of crystal nuclei may be one. Crystal growth may be controlled using an isothermal process, slow cooling, and zone annealing.

In some embodiments, an additive may be used to encourage the growth of a single crystal and/or its release from the mold. In some embodiments, in addition to the precursor (i.e., crystallizable organic molecules) for the organic solid crystal, a molecular feedstock may include an additive selected from polymers, oligomers, and small molecules, where the additive may have a melting onset temperature of at least 20° C. less than a melting onset temperature of the organic solid crystal precursor, e.g., 20° C., 30° C., or even 40° C. less than the melting onset temperature of the molding composition. An additive may promote crystal growth and the formation of a large crystal size. In some embodiments, an additive may be integrated with a molding process to improve the characteristics of a molded organic solid crystal substrate, including its surface roughness.

During the act of molding, and in accordance with particular embodiments, a cover plate may be applied to a free surface of the organic solid crystal feedstock. The cover plate may be oriented at an angle with respect to a major surface of the substrate. A force may be applied to the cover plate to generate capillary forces that facilitate mass transport of the molten feedstock, i.e., between the cover plate and the mold and in the direction of a crystallization front of a growing crystalline layer. In some embodiments, such as through vertical orientation of the deposition system, the force of gravity may contribute to mass transport and the delivery of the molten feedstock to the crystallization front. Suitable materials for the cover plate and the mold may independently include silicon dioxide, fused silica, high index glasses, high index inorganic crystals, and high melting temperature polymers (e.g., siloxanes, polyimides, PTFE, PFA, etc.), although further material compositions are contemplated.

According to particular embodiments, a method of forming an organic solid crystal (OSC) may include contacting an organic precursor (i.e., crystallizable organic molecules) with a non-volatile medium material, forming a layer including the organic precursor over a surface of a mold, and processing the organic precursor to form an organic crystalline phase, where the organic crystalline phase may include a preferred orientation of molecules.

The act of contacting the organic precursor with the non-volatile medium material may include forming a homogeneous mixture of the organic precursor and the non-volatile medium material. In further embodiments, the act of contacting the organic precursor with the non-volatile medium material may include forming a layer of the non-volatile medium material over a surface of a mold and forming a layer of the organic precursor over the layer of the non-volatile medium material.

In some embodiments, a non-volatile medium material may be disposed between the mold surface and the organic precursor and may be adapted to decrease the surface roughness of the molded organic solid crystal substrate and promote its release from the mold while locally inhibiting nucleation of a crystalline phase. Example non-volatile medium materials include liquids such as silicone oil, a fluorinated polymer, a polyolefin and/or polyethylene glycol. Further example non-volatile medium materials may include crystalline materials having a melting temperature that is less than the melting temperature of the organic precursor material. In some embodiments the mold surface may be pre-treated in order to improve wetting and/or adhesion of the non-volatile medium material.

The mold may include a surface that may be configured to provide a desired shape to the molded organic solid crystal. For example, the mold surface may be planar, concave, or convex, and may include a three-dimensional architecture, such as surface relief gratings, facets, or a curvature (e.g., compound curvature) configured to form microlenses, microprisms, or prismatic lenses. According to some embodiments, a mold geometry may be transferred and incorporated into a surface of an over-formed organic solid crystal layer.

The deposition surface of a mold may include a functional layer that is configured to be transferred to the organic solid crystal after formation of the organic solid crystal and its separation from the mold. Functional layers may include an interference coating, an AR coating, a reflectivity enhancing coating, a bandpass coating, a band-block coating, blanket, or patterned electrodes, etc. By way of example, an electrode may include any suitably electrically conductive material such as a metal, a transparent conductive oxide (TCO) (e.g., indium tin oxide or indium gallium zinc oxide), or a metal mesh or nanowire matrix (e.g., including metal nanowires or carbon nanotubes).

In lieu of, or in addition to, molding, further example deposition methods for forming organic solid crystals include vapor phase growth, solid state growth, melt-based growth, solution growth, etc., optionally in conjunction with a suitable mold and/or seed crystal. A mold may be organic or inorganic. By way of example, solid organic materials may be manufactured using one or more processes selected from chemical vapor deposition and physical vapor deposition. Further coating processes, e.g., from solution or a melt, may include 3D printing, ink jet printing, gravure printing, doctor blading, spin coating, and the like. Such processes may induce shear during the act of coating and accordingly may contribute to crystallite or molecular alignment and a preferred orientation of crystallites and/or molecules within an organic solid crystal substrate. A still further example method may include pulling a free-standing crystal from a melt. According to some embodiments, solid-, liquid-, or gas-phase deposition processes may include epitaxial processes.

As used herein, the terms "epitaxy," "epitaxial" and/or "epitaxial growth and/or deposition" refer to the nucleation and growth of an organic solid crystal on a deposition surface where the organic solid crystal layer being grown assumes the same crystalline habit as the material of the deposition surface. For example, in an epitaxial deposition process, chemical reactants may be controlled, and the system parameters may be set so that depositing atoms or molecules alight on the deposition surface and remain sufficiently mobile via surface diffusion to orient themselves according to the crystalline orientation of the atoms or molecules of the deposition surface. An epitaxial process may be homogeneous or heterogeneous.

In accordance with various embodiments, the optical and electrooptical properties of an organic solid crystal substrate suitable for forming a lens may be tuned using doping and related techniques. Doping may influence the polarizability of an organic solid crystal, for example. The introduction of dopants, i.e., impurities, into an organic solid crystal, may influence, for example, the highest occupied molecular orbital (HOMO) and lowest unoccupied molecular orbital (LUMO) bands and hence the band gap thereof, induced dipole moment, and/or molecular/crystal polarizability.

Doping may be performed in situ, i.e., during epitaxial growth, or following epitaxial growth, for example, using ion implantation or plasma doping. In exemplary embodiments, doping may be used to modify the electronic structure of an organic solid crystal without damaging molecular packing or the crystal structure itself. In this vein, a post-implantation annealing step may be used to heal crystal defects introduced during ion implantation or plasma doping. Annealing may include rapid thermal annealing or pulsed annealing, for example.

Doping changes the electron and hole carrier concentrations of a host material at thermal equilibrium. A doped organic solid crystal may be p-type or n-type. As used herein, "p-type" refers to the addition of impurities to an organic solid crystal that create a deficiency of valence electrons, whereas "n-type" refers to the addition of impurities that contribute free electrons to an organic solid crystal. Without wishing to be bound by theory, doping may influence "π-stacking" and "π-π interactions" within an organic solid crystal.

Example dopants include Lewis acids (electron acceptors) and Lewis bases (electron donors). Particular examples include charge-neutral and ionic species, e.g., Brønsted acids and Brønsted bases, which in conjunction with the aforementioned processes may be incorporated into an organic solid crystal by molding, solution growth, or co-deposition from the vapor phase. In particular embodiments, a dopant may include an organic molecule, an organic ion, an inorganic molecule, or an inorganic ion. A doping profile may be spatially homogeneous or localized to a particular region (e.g., depth or area) of an organic solid crystal.

During nucleation and growth, the orientation of the in-plane axes of an OSC layer may be controlled using one or more of mold temperature, deposition pressure, solvent vapor pressure, or non-solvent vapor pressure. High refractive index and highly birefringent organic solid crystal materials may be supported by a mold or removed therefrom to form a free-standing substrate. A mold, if used, may be rigid or deformable.

Example processes may be integrated with a real-time feedback loop that is configured to assess one or more attributes of the organic solid crystal and accordingly adjust one or more process variables, including melt temperature, mold temperature, feedstock injection rate into a mold, etc.

Following deposition, an OSC layer may be diced and polished to achieve a desired form factor and surface quality. Dicing may include diamond turning, for example, although other cutting methods may be used. Polishing may include chemical mechanical polishing. In some embodiments, a chemical or mechanical surface treatment may be used to create structures on a surface of an OSC layer. Example surface treatment methods include diamond turning and photolithography and etch processes. In some embodiments, a cover plate or mold with reciprocal structures may be used to fabricate surface structures in an OSC substrate.

An organic solid crystal substrate may include a surface that is planar, convex, or concave. In some embodiments, the surface may include a three-dimensional architecture, such as a periodic surface relief grating or surface facets. In further embodiments, a substrate may be configured as a microlens or a prismatic lens. For instance, polarization optics may include a microlens that selectively focuses one polarization of light over another. In some embodiments, a structured surface may be formed in situ, i.e., during crystal growth of the organic solid crystal material over a suitably shaped mold. In further embodiments, a structured surface may be formed after crystal growth, e.g., using additive or subtractive processing, such as 3D printing or photolithography and etching. The nucleation and growth kinetics and choice of chemistry may be selected to produce a solid organic crystal having areal (lateral) dimensions of at least approximately 1 cm.

The organic crystalline phase may be single crystal or polycrystalline. In some embodiments, the organic crystalline phase may include amorphous regions. In some embodiments, the organic crystalline phase may be substantially crystalline. The organic crystalline phase may be characterized by a refractive index along at least one principal axis of at least approximately 1.5 at 589 nm. By way of example, the refractive index of the organic crystalline phase at 589 nm and along at least one principal axis may be at least approximately 1.5, at least approximately 1.6, at least approximately 1.7, at least approximately 1.8, at least approximately 1.9, at least approximately 2.0, at least approximately 2.1, at least approximately 2.2, at least approximately 2.3, at least approximately 2.4, at least approximately 2.5, or at least approximately 2.6, including ranges between any of the foregoing values.

In some embodiments, the organic crystalline phase may be characterized by a birefringence (Δn), where $n_1 \neq n_2 \neq n_3$, $n_1 = n_2 \neq n_3$, $n_1 \neq n_2 = n_3$, or $n_1 = n_3 \neq n_2$, of at least approximately 0.05, e.g., at least approximately 0.05, at least approximately 0.1, at least approximately 0.2, at least approximately 0.3, at least approximately 0.4, or at least approximately 0.5, including ranges between any of the foregoing values. In some embodiments, a birefringent organic crystalline phase may be characterized by a birefringence of less than approximately 0.05, e.g., less than approximately 0.05, less than approximately 0.02, less than approximately 0.01, less than approximately 0.005, less than approximately 0.002, or less than approximately 0.001, including ranges between any of the foregoing values.

Organic solid crystals may be incorporated into passive and active optical waveguides, resonators, lasers, optical modulators, etc. Further example active optics include projectors and projection optics, ophthalmic high index lenses, eye-tracking, gradient-index optics, Pancharatnam-Berry phase (PBP) lenses, microlenses, pupil steering elements, optical computing, fiber optics, rewritable optical data storage, all-optical logic gates, multi-wavelength optical data processing, optical transistors, etc. According to further embodiments, organic solid crystals may be incorporated into passive optics, such as waveguides, reflective polarizers, refractive/diffractive lenses, and the like. Related optical elements for passive optics may include waveguides, polarization selective gratings, Fresnel lenses, microlenses, geometric lenses, PBP lenses, and multilayer thin films.

As will be appreciated, one or more characteristics of organic solid crystals may be specifically tailored for a particular application. For many optical applications, it may be advantageous to control crystallite size, surface roughness, mechanical strength and toughness, and the orientation of crystallites and/or molecules within an organic solid crystal.

According to various embodiments, an optical element including an organic solid crystal (OSC) may be integrated into an optical component or device, such as an OFET, OPV, OLED, etc., and may be incorporated into a structure or a device such as a waveguide, Fresnel lens (e.g., a cylindrical Fresnel lens or a spherical Fresnel lens), grating, photonic integrated circuit, birefringent compensation layer, reflective polarizer, index matching layer (LED/OLED), and the like. In certain embodiments, grating architectures may be tunable along one, two, or three dimensions. Optical elements may include a single layer or a multilayer OSC architecture.

The present disclosure is generally directed to optical configurations, devices including optical configurations, and associated methods. As is explained in greater detail below, embodiments of the present disclosure may include a Fresnel lens assembly suitable for virtual and/or augmented reality systems.

Example optical configurations may include a folded optic configuration including a Fresnel lens assembly. A Fresnel lens assembly may improve the operational efficiency of an optical configuration, for example, by decreasing optical losses. Increased optical efficiency may provide one or more of (a) improved image appearance (e.g., improved image brightness, uniformity and/or resolution), (b) increased lens efficiency, (c) decreased power consumption, and (d) decreased heat generation for a given brightness.

A Fresnel lens assembly may include an OSC-containing Fresnel lens and a reflective polarizer. A Fresnel lens may include a lens body having a structured surface having a plurality of facets, where the lens body is formed from an organic solid crystal having mutually-orthogonal refractive indices. In further examples, a Fresnel lens may include a lens body having a structured surface with a plurality of facets and steps located between neighboring facets of the plurality of facets, where the lens body includes an optically anisotropic organic solid crystal.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-10, detailed descriptions of OSC-containing Fresnel lenses, methods for forming such lenses, and associated optically anisotropic organic solid crystal materials. FIG. 1 shows an example optical configuration. FIGS. 2-6 show example Fresnel lens assemblies, display and imaging systems, and example ray paths. The discussion associated with FIG. 7 includes a description of a Fresnel lens formed from an organic solid crystal. The discussion associated with FIG. 8 includes a description of the use of a PBP lens in conjunction with a Fresnel lens for chromatic aberration correction in an optical configuration. The discussion associated with FIGS. 9 and 10 relates to various virtual reality platforms that may include a display device as described herein.

Fresnel lens assemblies including an OSC-based lens may be used in augmented reality and/or virtual reality (AR/VR) systems. In some examples, a Fresnel lens assembly may include a Fresnel lens and at least one other optical component, such as one or more of a reflective polarizer, an optical filter, an absorbing polarizer, a diffractive element, an additional refractive element, a reflector, an antireflection film, a mechanically protective film (e.g., a scratch-resistant film), or other optical component. An apparatus including a Fresnel lens assembly may further include a display and a beamsplitter.

In some examples, an AR/VR system may include a Fresnel lens assembly including a Fresnel lens and a polarized reflector. The optical properties of the Fresnel lens may be optimized individually, but in some examples the properties of a reflective polarizer, filler layer, or other layer may be configured to improve the Fresnel lens performance (e.g., by reducing chromatic aberration). In some examples, a Fresnel lens may be concave, convex, or may have a complex optical profile such as a freeform surface. For example, the structured surface of a Fresnel lens may include facets corresponding to portions of a freeform lens optical surface, or of other lens surfaces such as other concave or convex surfaces.

The wavelength-dependent properties of a Fresnel lens assembly, or polarized reflector, may be adjusted by, for example, adjusting one or more parameters of a multilayer film configuration (e.g., individual layer refractive indices, optical dispersion, and/or layer thicknesses). In some examples, a reflective polarizer may have a particular bandwidth of operation and the bandwidth of operation may be adjusted using one or more parameters of one or more components (e.g., refractive index, optical dispersion, layer thickness, and the like).

Applications of Fresnel lens assemblies may include use in the optical configuration of a wearable device (e.g., a head-mounted device), for example, use of one or more Fresnel lens assemblies in an optical configuration configured to form an image of a display viewable by a user when the user wears the wearable device. Other example applications may include IR rejection in, for example, imaging, display, projection, or photovoltaic systems. Applications may include wavelength selection for optical waveguides, for example, to select red, green, yellow, and/or blue wavelengths for transmission along a waveguide using a Fresnel lens assembly at the waveguide input. In some examples, a structured surface may be formed at the light entrance to any suitable optical component and configured as a Fresnel lens assembly.

FIG. 1 shows an optical configuration 100 including a display 105, beamsplitter 120, lens 130 and a polarized reflector 140. Light beams emitted by the display are shown as dashed lines. A light ray 145 is emitted by a display portion 110 of display 105, passes through the beamsplitter 120 and lens 130, and is reflected back as ray 150 from the polarized reflector 140. Refraction at the lens surfaces is not shown for illustrative convenience. The ray 150 is then reflected by the beamsplitter to give ray 155 which passes through the polarized reflector and is directed towards the eye of a user as ray 160. Stray light beams such as light beam 152 may reduce the beam intensity that reaches the eye of a user. The eye of a user is not shown, but a viewing location such as an eyebox may be located to the right of the optical configuration as illustrated. In some examples, the beamsplitter 120 may be formed as a partially reflective film (e.g., a thin metal film) on the convex lens surface 125 of the lens 130. In some examples, the optical configuration may further include an optical retarder which may, for example, be included as a layer formed on surface 135 of the polarized reflector 140.

Improvements in the optical configuration 100 may be desirable, such as reduced weight and power consumption in device applications. In some examples, the lens 130 may be a Fresnel lens formed from an OSC material. In some examples, the polarized reflector may be part of a Fresnel lens assembly. In some examples, the beamsplitter may be replaced by a polarized reflector to reduced losses associated with the beamsplitter.

A Fresnel lens may effectively divide a curved surface of a refractive lens (e.g., shown as convex lens surface 125 in FIG. 1) into facets. The facets may include curved portions (or planar approximations thereof) that approximate respective portions of the convex surface. There may be steps between the facets that allow the thickness of a Fresnel lens to be significantly less than that of a traditional convex lens. Fresnel lenses are discussed in more detail below.

Figure 2A:
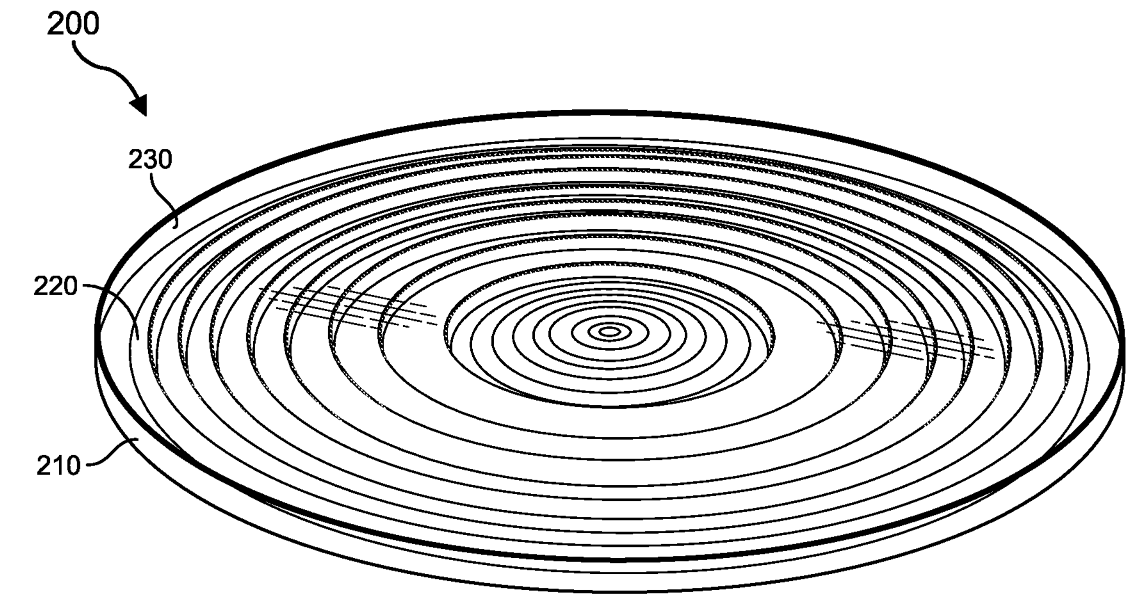
FIG. 2A is a perspective view of a Fresnel lens assembly in accordance with various embodiments.

FIG. 2A shows a Fresnel lens assembly 200 including a Fresnel lens 210 and a reflective polarizer 220. In this example, the facets of the Fresnel lens 210 are coated with the reflective polarizer 220. The Fresnel lens assembly may function as reflective polarizing Fresnel lens.

Figure 2B:
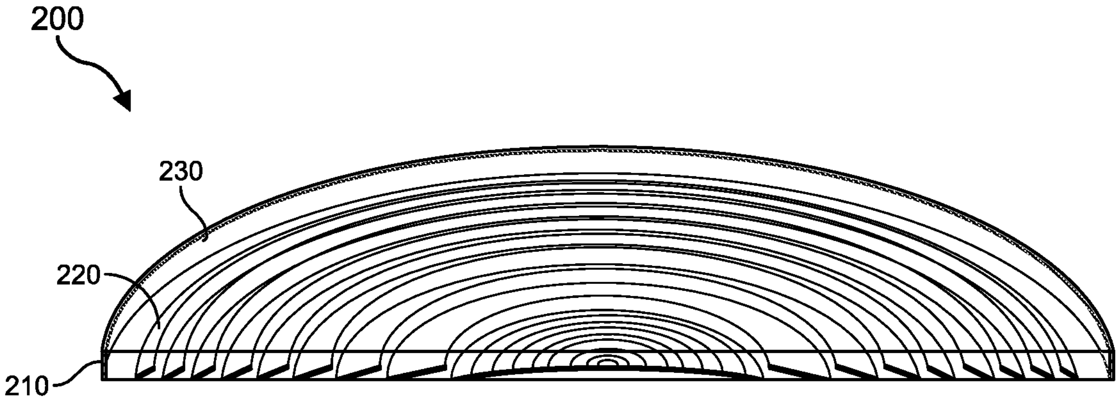
FIG. 2B is a sectioned perspective view of a Fresnel lens assembly in accordance with various embodiments.

FIG. 2B shows a sectional view of the Fresnel lens assembly 200 including the Fresnel lens 210. The facets of the Fresnel lens 210 support a layer that forms the reflective polarizer 220. In this example, the faceted side of the Fresnel lens is planarized using a filler layer 230. The filler layer may include an optically transparent material such as glass or an optical polymer. The filler layer may include air, a liquid, polymer, glass, ceramic, or a combination thereof.

In some examples, the filler layer may include one or more polymers, such as a polyethylene, a cyclic polyolefin (COP), an acrylate polymer (e.g., polymethylmethacrylate, PMMA), a silicone polymer (e.g., polydimethyl siloxane, PDMS), a urethane polymer, a polycarbonate, and the like, and/or combinations, derivatives or blends thereof. In some examples, the filler layer may include a gel or a low modulus polymer such as low molecular weight PDMS, or an oligomer such as a silicone oil.

Figure 2C:
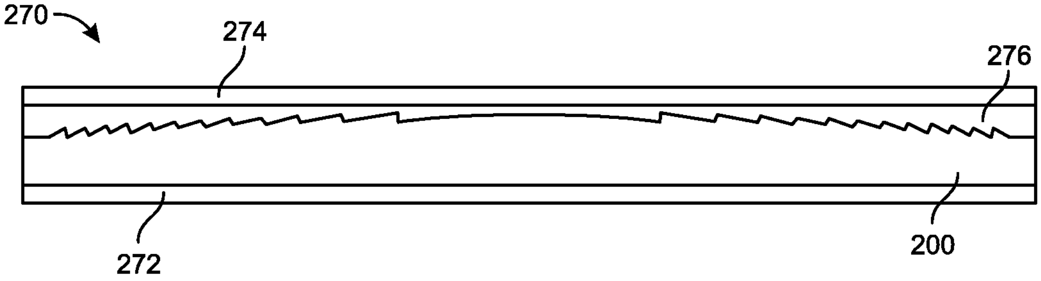
FIG. 2C is a cross-sectional view of a Fresnel lens assembly in accordance with various embodiments.

FIG. 2C shows an optical assembly 270 that includes a Fresnel lens assembly 200 (e.g., including a reflective polarizer) located at least in part between first and second substrates which may, for example, include a glass or a polymer. The first substrate 272 may support the Fresnel lens assembly. The second substrate 274 may provide mechanical protection for the upper surface profile of the Fresnel lens assembly. A gap 276 between the profiled substrate and the second substrate may include the filler layer. The filler layer may include a gas (e.g., air, nitrogen, a rare gas such as argon, or other gas that is non-reactive with the optical material), a liquid, or a solid. In some examples, a solid filler layer may also provide the second substrate so that a separate second substrate may be omitted. In some examples, the filler layer has an appreciably different refractive index (e.g., substantially lower than) the refractive index of the optical material used to fabricate the Fresnel lens. In some examples, the second substrate or the first substrate may include a reflective polarizer. In some examples, the faceted surface of a Fresnel lens may be planarized using a filler layer and a reflective polarizer may be located on the filler layer.

In some examples, the Fresnel lens and the filler layer include the same material. In some examples, the Fresnel lens and the filler layer may have a matched refractive index for at least one wavelength (e.g., of visible light), but the two materials may have different optical dispersions. In some examples, the Fresnel lens and the filler layer may have substantially different refractive indices. For example, the refractive index of the filler layer may differ by at least approximately 0.1, 0.2, 0.5 or more from that of the Fresnel lens.

In some examples, at least one of the Fresnel lens and filler layer may have a low value of birefringence, and may have an optical retardance for at least one wavelength of visible light that is less than ¼ wave, such as less than ⅛ wave, and in some examples, less than 1/16 wave.

Figure 3:
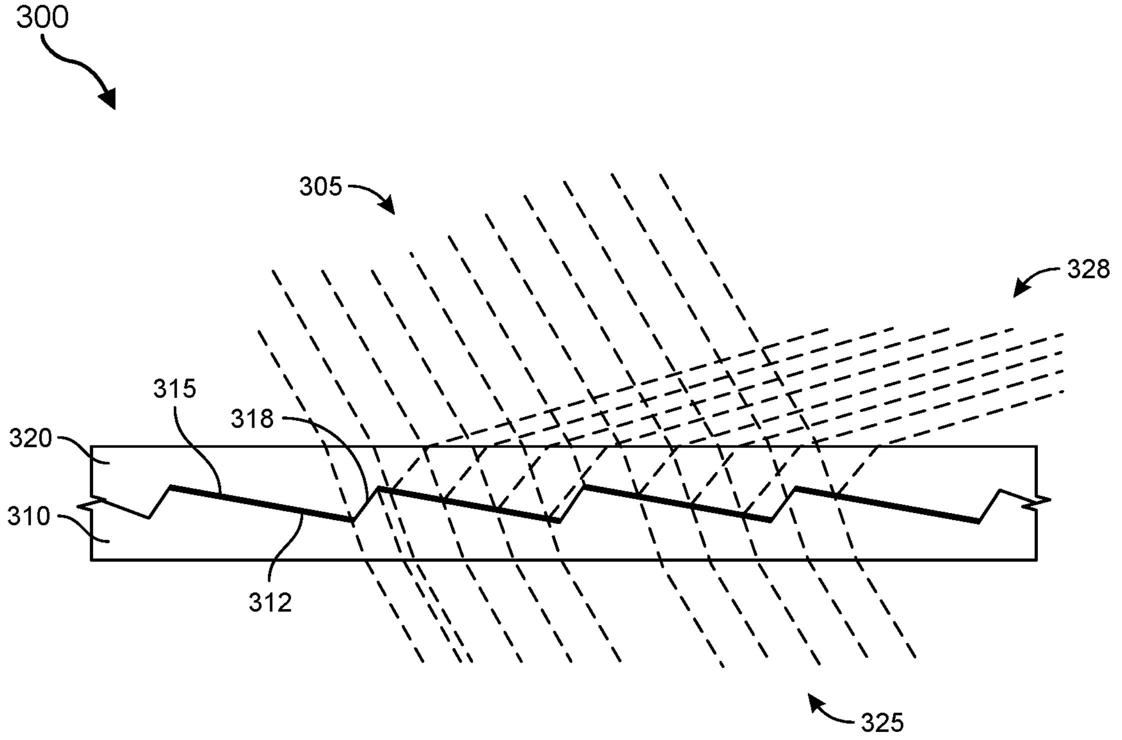
FIG. 3 shows light propagation through a cross section of an example Fresnel lens assembly in accordance with some embodiments.

FIG. 3 shows possible light propagation through a cross section of an example Fresnel lens assembly 300. The Fresnel lens assembly 300 includes a Fresnel lens 310, a reflective polarizer 315, and a filler layer 320. The facets 312 of the Fresnel lens 310 support the reflective polarizer 315, denoted in the figure by a thick line. Adjacent facets 312 are separated by steps 318. The reflective polarizer is configured to reflect a first polarization of light and transmit a second polarization of light. A light ray bundle 305 may include light having the first polarization that is reflected by the reflective polarizer 315 to form reflected ray bundle 328, and may include light of the second polarization that is transmitted by the reflective polarizer to form transmitted ray bundle 325.

Figure 4:
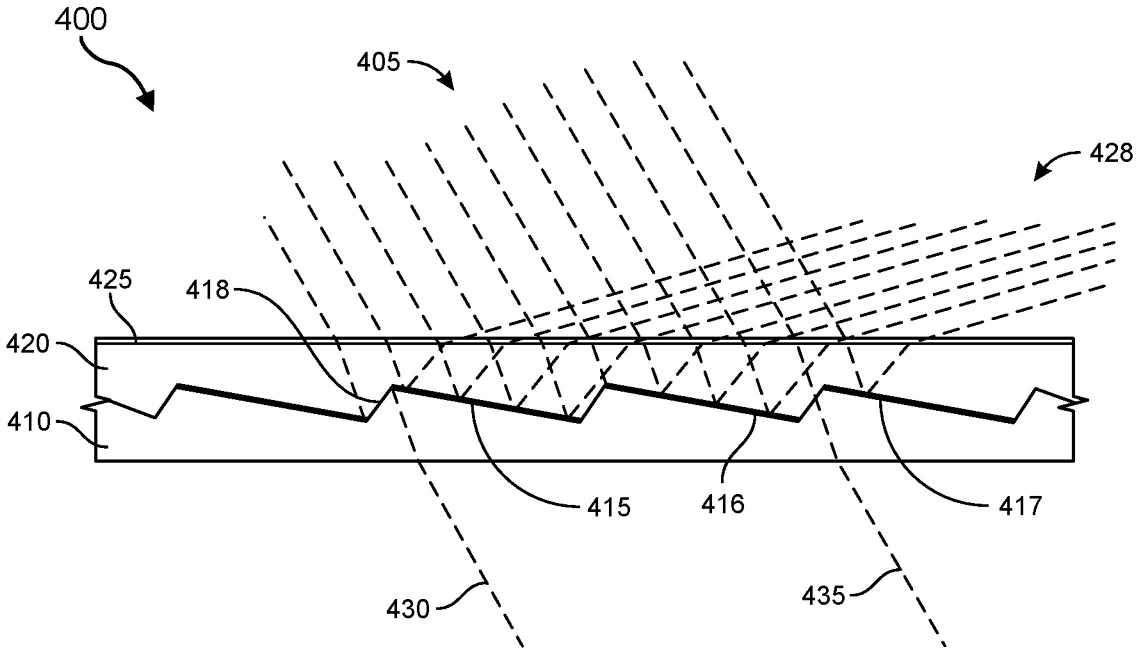
FIG. 4 shows a cross section of an example Fresnel lens assembly in accordance with further embodiments.

FIG. 4 shows a cross section of an example Fresnel lens assembly 400 including a Fresnel lens 410, reflective polarizers 415, 416, 417, a filler layer 420, and an absorbing polarizer 425. Incident light rays are shown as ray bundle 405 and reflected light rays are shown as ray bundle 428. The absorbing polarizer 425 may transmit a first polarization of light that is reflected by reflective polarizers 415, 416 and 417. The absorbing polarizer 425 may absorb a second polarization of light that would otherwise be transmitted by the reflective polarizers 415, 416, 417. A step 418 may be located between adjacent reflective polarizer facets. In some examples, a reflective layer (e.g., a metal film) may be used in place of the reflective polarizers. Stray light rays (such as rays 430 and 435) may be transmitted through the Fresnel lens assembly. In some examples, stray light rays may pass through a gap between reflective polarizers, such as through the gap between reflective polarizers 416 and 417. Stray light rays may arise due to multiple reflections off the reflective polarizers and/or other interfaces.

Figure 5:
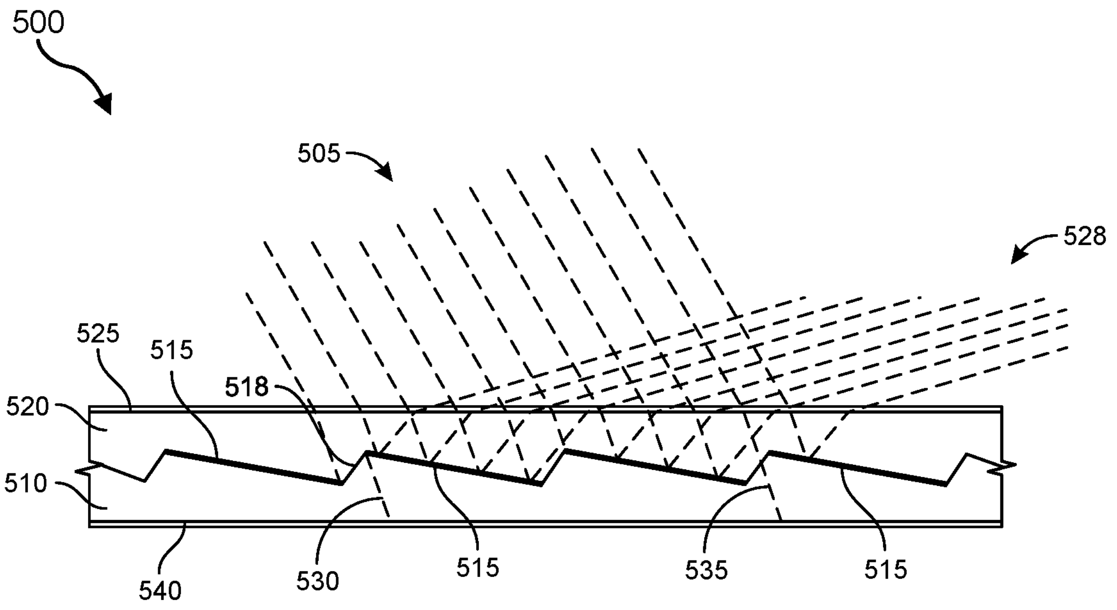
FIG. 5 shows a cross section of a further example Fresnel lens assembly in accordance with certain embodiments.

FIG. 5 shows a cross section of an example Fresnel lens assembly 500 including Fresnel lens 510, reflective polarizer 515 located on a facet of the Fresnel lens 510, filler layer 520, absorbing polarizer 525, and second absorbing polarizer 540. A step 518 may be located between adjacent facets. Incident light rays are shown as ray bundle 505 and reflected light rays are shown as ray bundle 528. The Fresnel lens assembly 500 may function in a similar manner to the Fresnel lens assembly 400 described above in relation to FIG. 4. The second absorbing polarizer 540 may absorb stray light rays such as rays 530 and 535.

Figure 6:
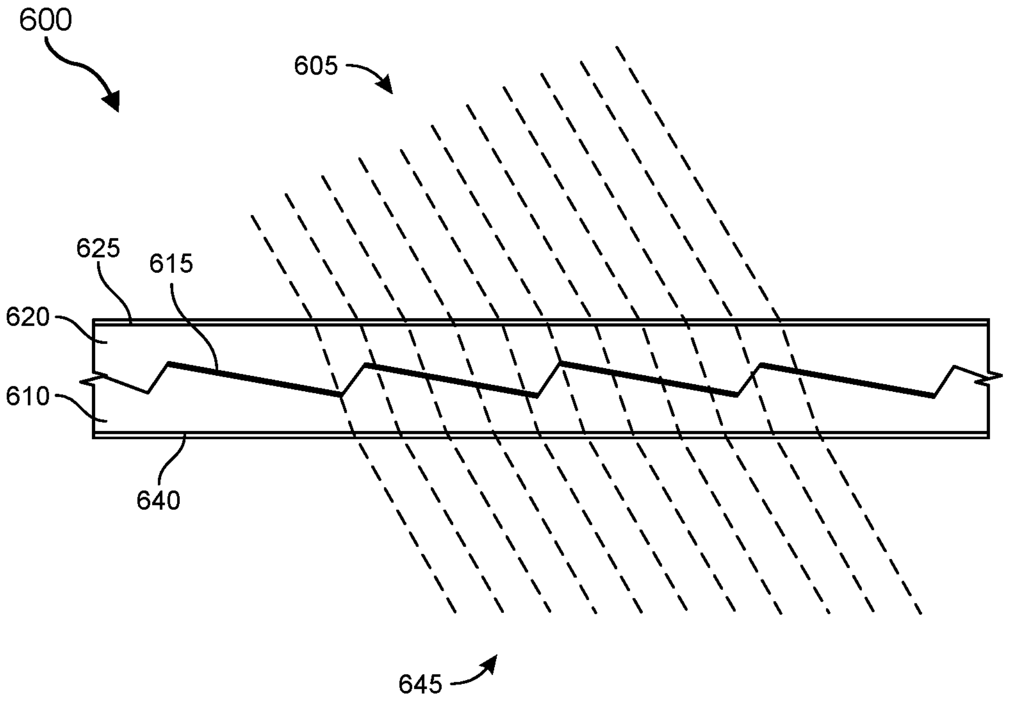
FIG. 6 shows a cross section of an example Fresnel lens assembly in accordance with still further various embodiments.

FIG. 6 shows a cross section of an example Fresnel lens assembly 600 including Fresnel lens 610, reflective polarizer 615 located on a facet of the Fresnel lens 610, filler layer 620, first polarizer 625 and second polarizer 640. In this example, a ray bundle 605 may be polarized (or further polarized) by first polarizer 625. Ray bundle 605 may have a polarization state that is preferentially transmitted by the reflective polarizer 615. Second polarizer 640 may be configured to preferentially transmit ray bundle 605 to form ray bundle 645.

Figure 7:
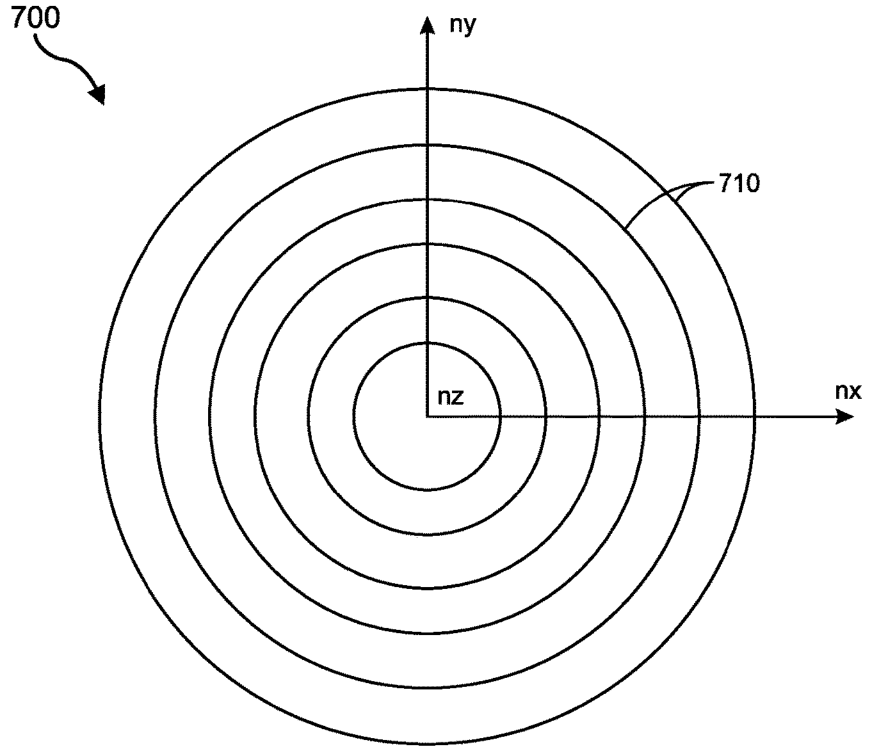
FIG. 7 shows the principle refractive index axes in an example OSC-containing Fresnel lens structure according to some embodiments.

Referring to FIG. 7, shown is a top-down schematic view of a Fresnel lens 700 having a plurality of annular facets 710. Fresnel lens 700 may be formed from an organic solid crystal material having principal refractive indices $n_x$, $n_y$, $n_z$, where in-plane refractive indices $n_x$ and $n_y$ may be aligned with radial directions of the lens 700, and $n_z$ may be oriented along the axial direction.

Figure 8:
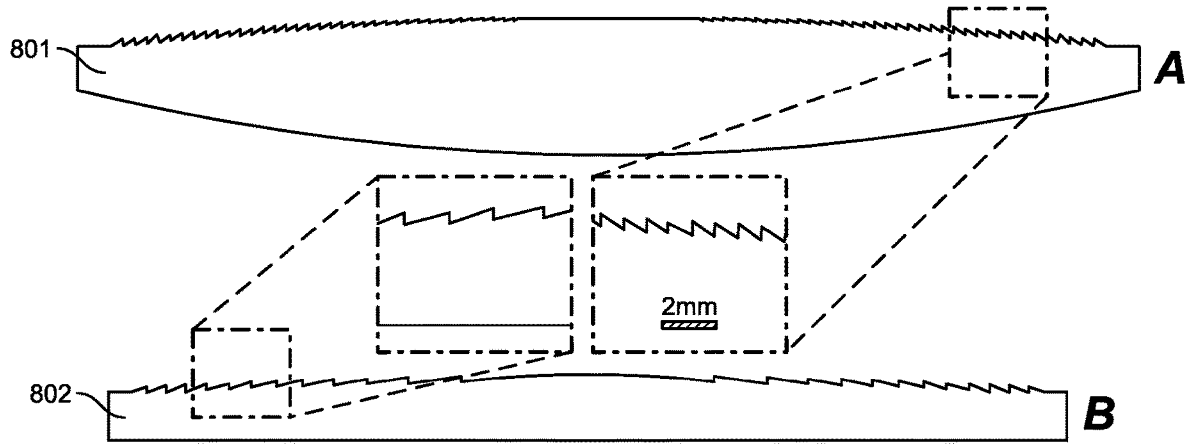
FIG. 8 a cross-sectional view showing comparative and illustrative Fresnel lenses according to various embodiments.

Turning to FIG. 8, shown are cross-sectional views for (A) comparative and (B) illustrative Fresnel lenses. Referring initially to FIG. 8A, in the diffractive limit for comparative lens 801, the lens facets may have a pitch of approximately 0.5 micrometers, which may correspond to an optical resolution of approximately 3-4 arcmin. Referring to FIG. 8B, for OSC-based Fresnel lens 802, to achieve comparable optical power, the high index Fresnel lens 802 may have less overall curvature and a greater inter-facet pitch, and may exhibit an optical resolution of approximately 1 arcmin.

Figure 9:
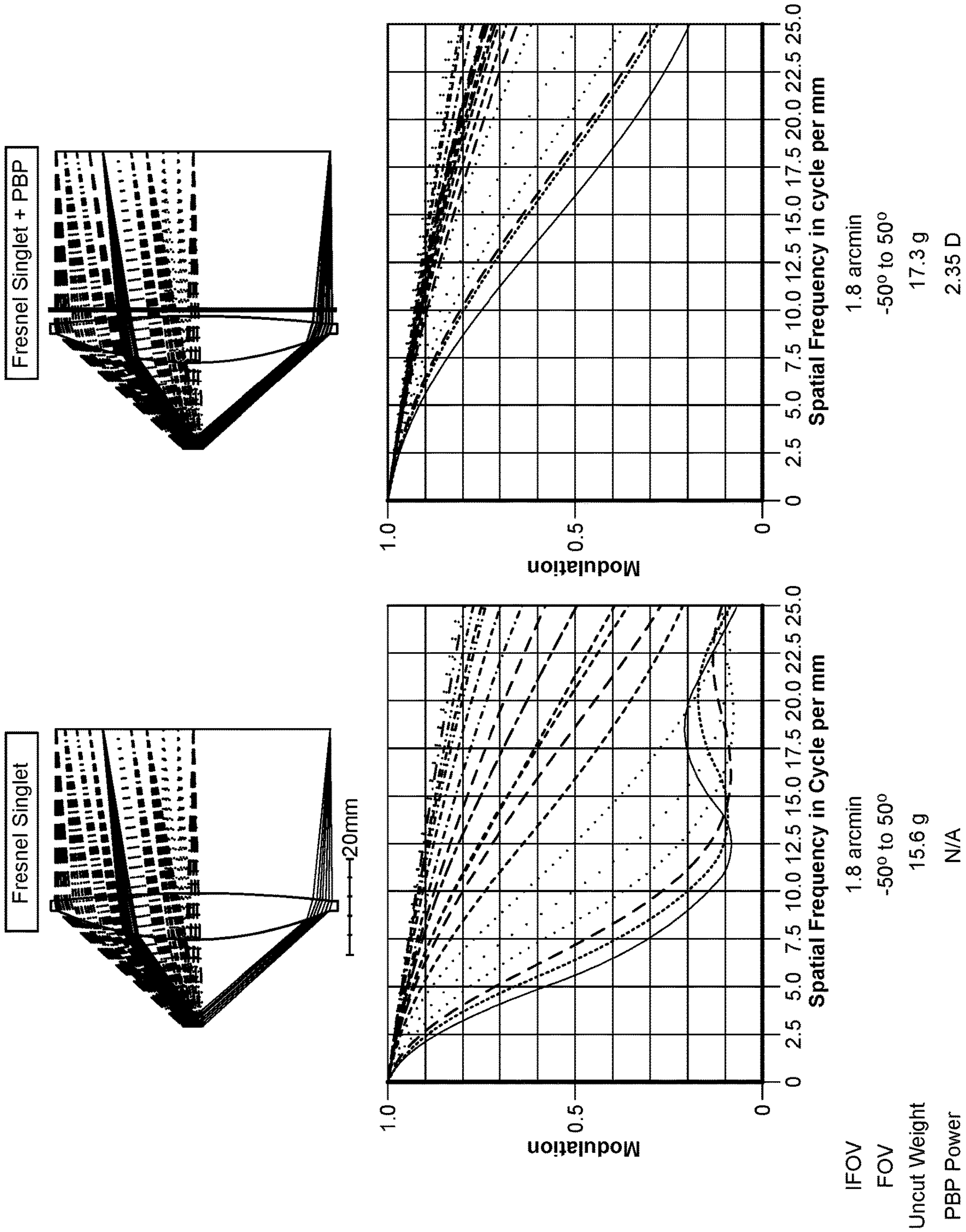
FIG. 9 shows Pancharatnam-Berry phase (PBP) lens-directed chromatic aberration correction in organic solid crystal Fresnel lenses according to some embodiments.

In some embodiments, an optical configuration may include a Fresnel lens assembly having a Fresnel lens and a Pancharatnam-Berry Phase lens overlying the Fresnel lens. Referring to FIG. 9, shown are plots of the geometric modulation transfer function (MTF) (±30° gaze) versus spatial frequency and the effects of integrating a Pancharatnam-Berry phase (PBP) lens into a Fresnel lens assembly, including an associated improvement in chromatic aberration.

Disclosed are Fresnel lenses formed from high index organic solid crystals (OSCs). Exemplary OSCs are low weight, low light loss materials that are available at a relatively low cost. According to some embodiments, geometric aberrations due to the birefringence of some OSCs may be corrected by forming a lens having a bi-conic surface architecture. According to further embodiments, chromatic aberration caused by the relatively high dispersion of OSCs may be corrected by incorporating a Pancharatnam-Berry phase (PBP) diffractive lens.

EXAMPLE EMBODIMENTS

Example 1: A Fresnel lens includes a lens body having a structured surface with a plurality of facets, where the lens body includes an organic solid crystal having mutually-orthogonal refractive indices, $n_x$, $n_y$, $n_z$.

Example 2: The Fresnel lens of Example 1, where the lens body of the Fresnel lens includes a second surface opposite to the structured surface, and the second surface includes a planar, concave, or convex surface.

Example 3: The Fresnel lens of any of Examples 1 and 2, where the structured surface includes a bi-conic architecture.

Example 4: The Fresnel lens of any of Examples 1-3, where the structured surface includes a first curvature along a first direction of the lens body and a second curvature along a second direction of the lens body orthogonal to the first direction.

Example 5: The Fresnel lens of any of Examples 1-4, where the structured surface includes steps located between neighboring facets of the plurality of facets.

Example 6: The Fresnel lens of any of Examples 1-5, where the organic solid crystal includes a single crystalline phase.

Example 7: The Fresnel lens of any of Examples 1-6, where $n_x=n_y\neq n_z$, $n_x=n_z\neq n_y$, $n_y=n_z\neq n_x$, or $n_x\neq n_y\neq n_z$.

Example 8: The Fresnel lens of any of Examples 1-7, where $n_x>1.6$.

Example 9: The Fresnel lens of any of Examples 1-8, where $n_x>n_z>n_y$.

Example 10: An apparatus includes a display and an optical configuration configured to receive display light from the display, where (a) the optical configuration includes a Fresnel lens assembly having a Fresnel lens and a Pancharatnam-Berry Phase lens overlying the Fresnel lens, (b) the Fresnel lens includes a lens body having a structured surface with a plurality of facets, (c) and the lens body includes an organic solid crystal having mutually-orthogonal refractive indices, $n_x$, $n_y$, $n_z$.

Example 11: The apparatus of Example 10, where the apparatus includes an augmented reality device or a virtual reality device.

Example 12: The apparatus of any of Examples 10 and 11, where the apparatus includes a head-mounted display and the display light is viewable by a user of the apparatus when the user wears the head-mounted display.

Example 13: The apparatus of any of Examples 10-12, where the optical configuration further includes a beamsplitter lens and an optical retarder.

Example 14: The apparatus of any of Examples 10-13, where the optical configuration has a folded-optic geometry where the display light is both reflected by and transmitted through the Fresnel lens assembly as the display light passes from the display through the optical configuration.

Example 15: The apparatus of any of Examples 10-14, where the lens body of the Fresnel lens includes a second surface opposite to the structured surface, and the second surface includes a planar, concave, or convex surface.

Example 16: The apparatus of any of Examples 10-15, where the structured surface includes a bi-conic architecture.

Example 17: The apparatus of any of Examples 10-16, where the structured surface includes a first curvature along a first direction of the lens body and a second curvature along a second direction of the lens body orthogonal to the first direction.

Example 18: The apparatus of any of Examples 10-17, where the structured surface includes steps located between neighboring facets of the plurality of facets.

Example 19: The apparatus of any of Examples 10-18, where $n_x=n_y\neq n_z$, $n_x=n_z\neq n_y$, $n_y=n_z\neq n_x$, or $n_x\neq n_y\neq n_z$.

Example 20: A Fresnel lens including a lens body having a structured surface having a plurality of facets and steps located between neighboring facets of the plurality of facets, where the lens body includes an optically anisotropic organic solid crystal.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
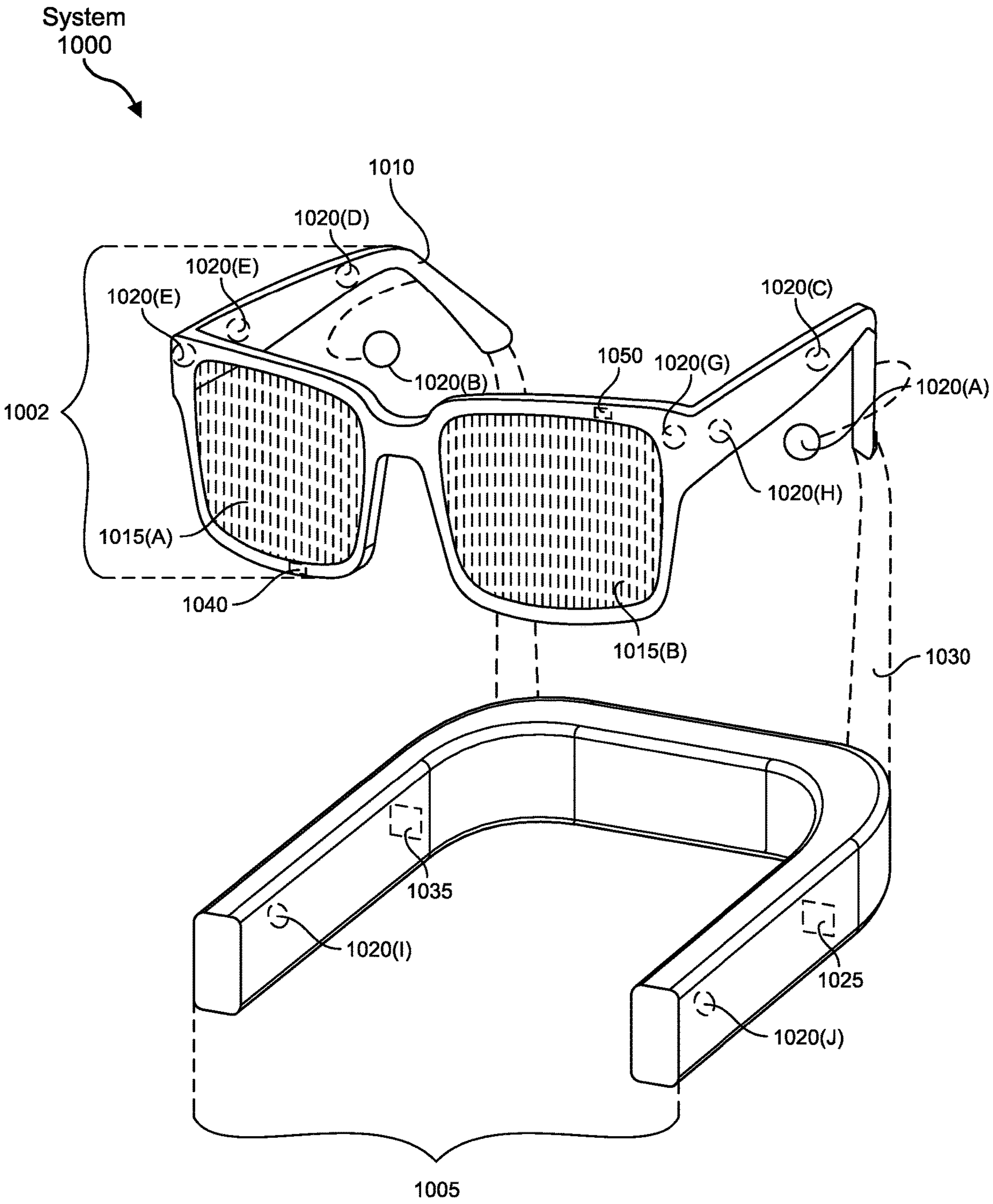
FIG. 10 is an illustration of exemplary augmented-reality glasses that may be used in connection with embodiments of this disclosure.
Figure 11:
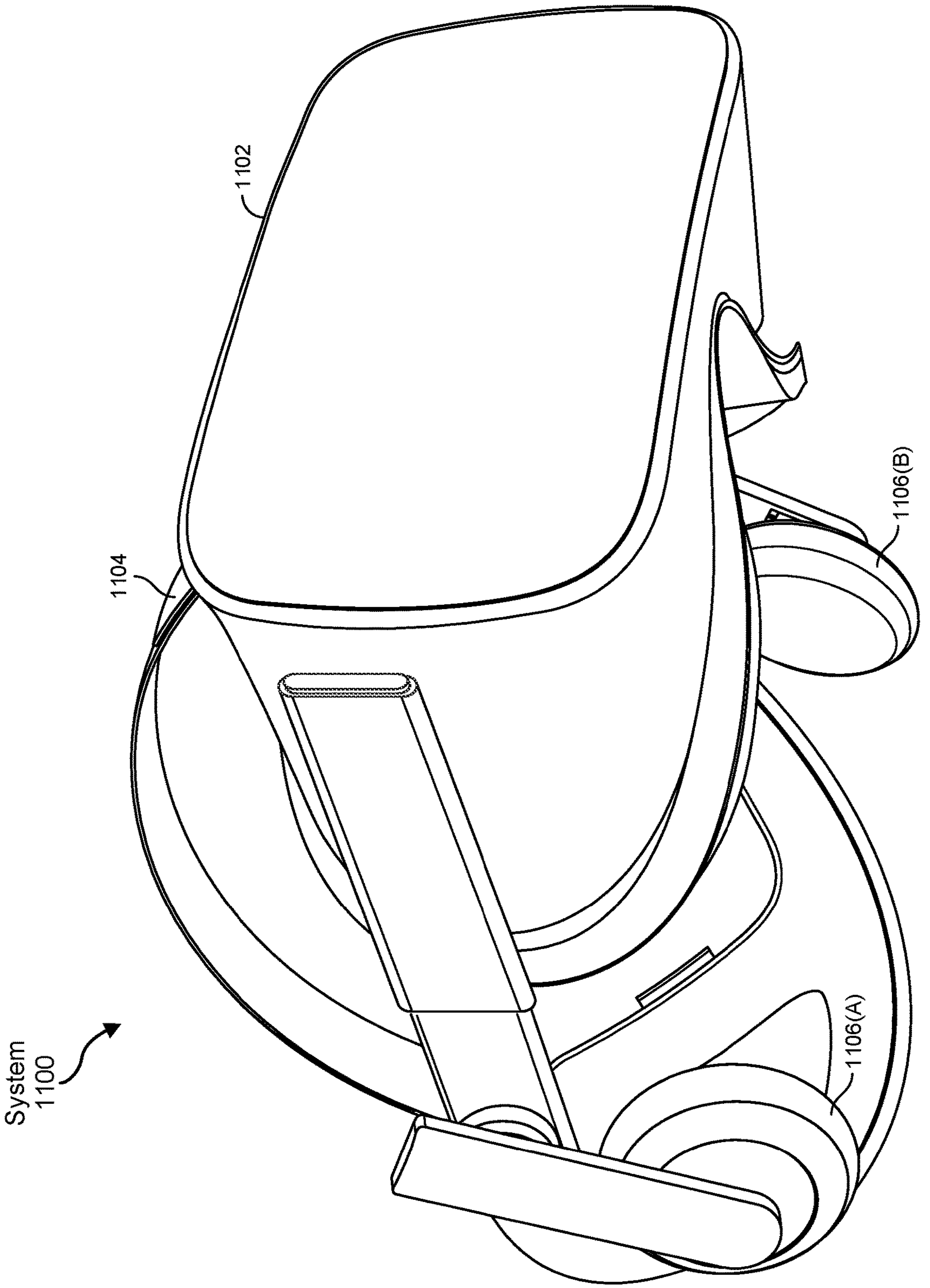
FIG. 11 is an illustration of an exemplary virtual-reality headset that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 11, output audio transducers 1106(A) and 1106(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 10, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a Fresnel lens that comprises or includes an organic solid crystal include embodiments where a Fresnel lens consists essentially of an organic solid crystal and embodiments where a Fresnel lens consists of an organic solid crystal.

What is claimed is:

1. A Fresnel lens comprising:

a lens body comprising an organic solid crystal having mutually-orthogonal refractive indices, $n_x$, $n_y$, $n_z$; and the lens body having a bi-conic architecture and a structured surface comprising a plurality of facets, wherein the lens body is configured to reduce geometric aberrations arising from birefringence of the organic solid crystal.

2. The Fresnel lens of claim 1, wherein the lens body of the Fresnel lens comprises a second surface opposite to the structured surface, and the second surface comprises a planar, concave, or convex surface.

3. The Fresnel lens of claim 1, wherein the structured surface comprises a first curvature along a first direction of the lens body and a second curvature along a second direction of the lens body orthogonal to the first direction.

4. The Fresnel lens of claim 1, wherein the structured surface comprises steps located between neighboring facets of the plurality of facets.

5. The Fresnel lens of claim 1, wherein the organic solid crystal comprises a single crystalline phase.

6. The Fresnel lens of claim 1, wherein $n_x = n_y \neq n_z$, $n_x = n_z \neq n_y$, $n_y = n_z \neq n_x$, or $n_x \neq n_y \neq n_z$.

7. The Fresnel lens of claim 1, wherein $n_x > 1.6$.

8. The Fresnel lens of claim 1, wherein $n_x > n_z > n_y$.

9. The Fresnel lens of claim 1, wherein each of the facets in the plurality of facets have a pitch of approximately 0.5 micrometers.

10. An apparatus comprising:

a display; and an optical configuration configured to receive display light from the display, wherein:

the optical configuration comprises a Fresnel lens assembly including a Fresnel lens and a Pancharatnam-Berry Phase lens overlying the Fresnel lens;

the Fresnel lens comprises a lens body having an organic solid crystal having mutually-orthogonal refractive indices, $n_x$, $n_y$, $n_z$; and the lens body having a bi-conic architecture and a structured surface comprising a plurality of facets, wherein the lens body is configured to reduce geometric aberrations arising from birefringence of the organic solid crystal.

11. The apparatus of claim 10, wherein the apparatus comprises an augmented reality device or a virtual reality device.

12. The apparatus of claim 10, wherein:

the apparatus comprises a head-mounted display; and the display light is viewable by a user of the apparatus when the user wears the head-mounted display.

13. The apparatus of claim 10, wherein the optical configuration further comprises:

a beamsplitter lens; and an optical retarder.

14. The apparatus of claim 10, wherein the optical configuration has a folded-optic geometry where the display light is both reflected by and transmitted through the Fresnel lens assembly as the display light passes from the display through the optical configuration.

15. The apparatus of claim 10, wherein the lens body of the Fresnel lens comprises a second surface opposite to the structured surface, and the second surface comprises a planar, concave, or convex surface.

16. The apparatus of claim 10, wherein the structured surface comprises a first curvature along a first direction of the lens body and a second curvature along a second direction of the lens body orthogonal to the first direction.

17. The apparatus of claim 10, wherein the structured surface comprises steps located between neighboring facets of the plurality of facets.

18. The apparatus of claim 10, wherein $n_x = n_y \neq n_z$, $n_x = n_z \neq n_y$, $n_y = n_z \neq n_x$, or $n_x \neq n_y \neq n_z$.

19. The apparatus of claim 10, wherein each of the facets in the plurality of facets have a pitch of approximately 0.5 micrometers.

20. A Fresnel lens comprising:

a lens body comprising an optically anisotropic organic solid crystal; and the lens body having a bi-conic architecture and a structured surface comprising a plurality of facets and steps located between neighboring facets of the plurality of facets, wherein the lens body is configured to reduce geometric aberrations arising from the optically anisotropic organic solid crystal.

* * * * *